United States Patent [19]
Jessen

[11] Patent Number: 5,916,510
[45] Date of Patent: Jun. 29, 1999

[54] CHANNELED CERAMIC STRUCTURE AND PROCESS FOR MAKING SAME

[75] Inventor: Todd Jessen, Alexandria, Va.

[73] Assignee: The United States of America as represented by the Secretary of the Navy, Washington, D.C.

[21] Appl. No.: 09/167,552

[22] Filed: Oct. 7, 1998

Related U.S. Application Data

[62] Division of application No. 08/771,120, Dec. 20, 1996, Pat. No. 5,858,513.

[51] Int. Cl.$^6$ ............................... C04B 33/32; B28B 1/00
[52] U.S. Cl. ......................... 264/610; 264/44; 264/629; 264/640; 264/642
[58] Field of Search .................................. 156/77, 89.11, 156/89.27, 323; 264/43, 44, 605, 616, 628, 629, 640, 642

[56] References Cited

U.S. PATENT DOCUMENTS

| | | | |
|---|---|---|---|
| 2,681,865 | 6/1954 | Heine | 428/188 |
| 4,788,096 | 11/1988 | Kalnin et al. | 428/188 |
| 4,839,214 | 6/1989 | Oda et al. | 428/188 |
| 5,196,271 | 3/1993 | White et al. | 428/545 |

*Primary Examiner*—Donald Loney
*Attorney, Agent, or Firm*—Thomas E. McDonnell; George A. Kap

[57] ABSTRACT

Ceramic structure having porosity of 10–80% is characterized by a solid ceramic matrix having therein elongated and parallel channels, the structure is made by a process that includes the steps of:

(a) arranging tows of elongated fibers parallel to each other to form a fiber preform,
(b) contacting the fiber preform with a matrix precursor whereby the matrix precursor deposits around the fibers,
(c) removing the fiber preform from the matrix precursor,
(d) drying the fiber preform,
(e) calcining the fiber preform,
(f) hot pressing the structure containing the fugitive fibers therein, and
(g) removing at least some of the fibers to form channels in the structure.

7 Claims, 1 Drawing Sheet

CHANNELED CERAMIC STRUCTURE AND PROCESS FOR MAKING SAME

This application is a division of application Ser. No. 08/771,120, filed Dec. 20, 1996 now U.S. Pat. No. 5,858,513.

BACKGROUND OF INVENTION

1. Field of Invention

This invention pertains to porous or channeled ceramic structure and process for making same using fugitive fibers to produce the porosity.

2. Description of Prior Art

Typical prior art processes for generating porosity in a ceramic structure include phase removal with an etchant and removal of a fugitive particulate phase. In the first process, an acidic or basic etchant is used to preferentially remove an existing phase whereas in the second process, porosity is developed by the use of mild heat treatment to remove an organic phase. The prior art processes are characterized by the use of particulate materials which are removed to develop continuous or discontinuous pores.

The prior art processes have significant disadvantages. The etchant process results in a liquid or a sludge by-product which may be difficult to dispose; residual anion or cation deposits in pores following the use of the etchant; and a limitation in terms of compositions for which this type of process is possible. The heat process suffers from lack of control as to pore location; continuity and size due to the use of particulate precursors; and from irregularly shaped pores and surface finish of the pores.

A variety of military and commercial applications employ porous ceramic structures. These applications include solid state gas sensors for carbon dioxide, where various ceramic structures are typically used, and for oxygen, where titania is typically used; bioceramic medical implants where hydroxyapatite is used; solid oxygen fuel cells where strontium-doped lanthanum magnatite is typically used; positive temperature coefficient thermistors where barium titanate is typically used; solid/liquid/gas filtration where silicon carbide and titania are typically used; and transducer materials for sensors and biomedical applications where lead zirconate titanate is typically used.

In all the above noted applications, addition of porosity to the ceramic structures enhanced their performance or led to new applications.

SUMMARY OF INVENTION

An object of this invention is a relatively light ceramic structure containing continuous, parallel channels therein, positioning of which can be varied in a controlled fashion.

Another object of this invention is a ceramic structure containing continuous, parallel channels therein of more than one diameter, positioning of which can be varied in a controlled fashion.

Another object of this invention is a porous ceramic structure having in excess of 10% porosity due to the presence to channels therein.

Another object of this invention is a process for making a ceramic structure containing continuous, parallel channels therein positioning of which can be varied in a controlled fashion.

These and other objects of this invention are attained by a ceramic structure containing continuous, parallel channels of same or different diameters which structure is made by a process characterized by the use of continuous, parallel fugitive fibers which are subsequently removed to form the channels in the ceramic structure.

DESCRIPTION OF PREFERRED EMBODIMENTS

This invention pertains to a porous ceramic structure that can be used at high temperatures exceeding 1000° C. containing continuous and parallel channels therein and to a process for its preparation. The porous ceramic structure of this invention is not intended for load bearing applications.

Presence of continuous channels in a ceramic structure makes it possible to use the structures in new applications or to enhance performance of such structures in a way that was not possible in the past. For instance, the novel ceramic structures can be used in medical applications, such as bone repair where the continuous channels permit bone growth elements to enter the channels and produce a strong bond between a living bone and the channeled ceramic structure. Porous ceramic structures where porosity is developed by the use of particulate materials are unsuitable because the strong bond does not form due to insufficient depth of the pores. The presence of channels in a ceramic structure enhances performance in a transducer where its hydrostatic charge coefficient can be improved by reducing certain negative parameters.

Figure 1:
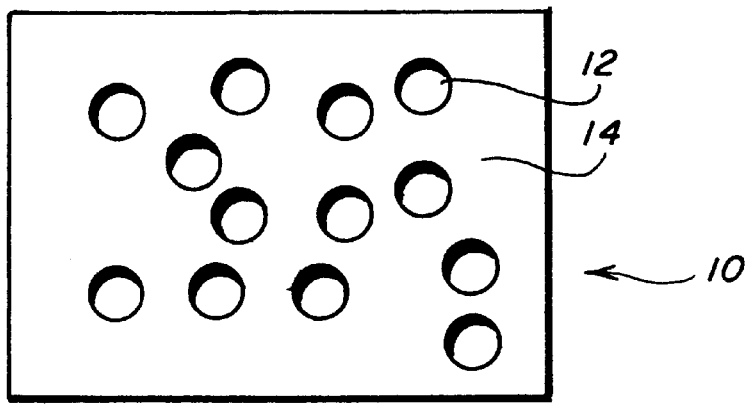
FIG. 1 is a schematic representation of a cross-section of a ceramic structure illustrating channels of the same size disposed in a ceramic matrix.

In an embodiment illustrated in FIG. 1, ceramic structure 10 is shown as consisting of a plurality of channels 12 disposed in ceramic matrix 14. The channels are shown as being spaced, elongated and parallel to each other although it is possible to orient them in any direction desired, such as vertically, perpendicularly, at an angle, or a combination thereof. Typically, the channels extend through the entire thickness of a ceramic structure although this need not be so. If desired, the channels can extend only partly into a ceramic structure or be disposed within a ceramic structure such that the channels are closed at both ends thereof.

Figure 2:
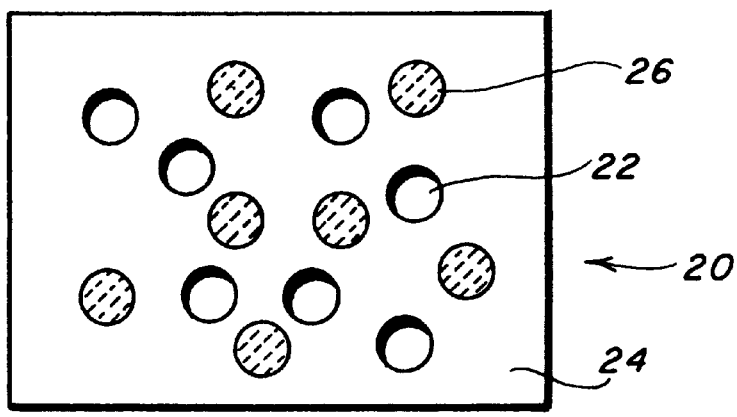
FIG. 2 is a schematic representation of a cross-section of a ceramic structure illustrating channels and reinforcing fibers in a ceramic matrix.

Another embodiment of the invention is schematically illustrated in FIG. 2 where channels 22 are shown embedded in ceramic matrix 24 which forms ceramic structure 20. FIG. 2 also shows reinforcing fibers 26, typically ceramic, embedded in ceramic matrix 20. Reinforcing fibers 26 can be used by a designer to make stronger ceramic structures or ceramic structures having other enhanced properties. The structure comprises at least 10% and up to 80% by volume, preferably 30–70%, and especially about 50% of the channels. The channels represent porosity in the ceramic structure. The channels are formed by fugitive fibers which are initially incorporated into the ceramic structure and subsequently removed, as by heat, to form the channels.

Figure 3:
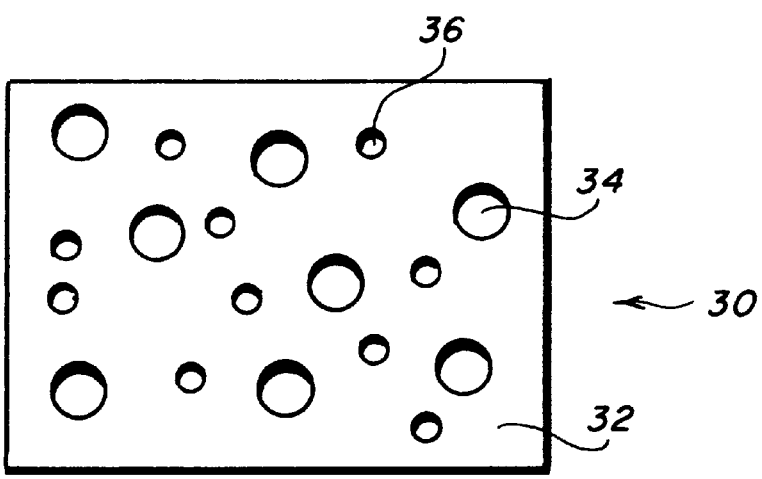
FIG. 3 is a schematic representation of a cross-section of a ceramic structure illustrating channels of two different sizes in a ceramic matrix.

FIG. 3 illustrates still another embodiment of the invention where ceramic structure 30 is composed of ceramic matrix 32 having disposed therein spaced channels 34, 36, of different diameters. Channels of more than one different diameter can be present in a ceramic structure and the structure can also include reinforcing fibers.

The ceramic structure can include 10 to 80% by volume, preferably 30 to 70%, of porosity due to the presence of channels therein, whether the reinforcing fibers are present or not. When the ceramic structure is reinforced with the reinforcing fibers, the structure can include up to 80%, especially 10–70% by volume, of the reinforcing fibers.

A wide variety of ceramic matrices can be used to make the ceramic structures. Suitable matrices include piezoelectric ceramic compositions such as barium titanate and lead zirconate titanate; structural ceramics such as silicon nitride, silicon carbide, silica, 96% silica with 4% boron oxide, zirconia, titania, zirconia-titania mix, zirconium titanate, mullite and cordierite; and specialty ceramics such as hydroxyapatite. The typical matrix is dependent upon the desired application of the ceramic structure.

Fugitive fibers are used to create the channnels. Fugitive fibers are initially incorporated into a ceramic structure and are subsequently burned out by means of a special heat treatment following the consolidation/densification operation. During the special heat treatment, the fugitive fibers are removed leaving channels in the ceramic structure.

Fugitive fibers can be made of any material that can be removed without leaving a residue. Fugitive fibers are typically made of carbon or a polymeric material. Although vaporization by application of heat is the typical manner of removing the fugitive fibers, other approaches can also be used, including chemical etching.

Numerous fiber arrangement schemes with fugitive or fugitive with reinforcing fibers can be envisioned based on this invention's concept. An additional benefit beyond the general improvement in any desired property with this technique, is that, by simple rearrangement of the fiber schemes, new applications can be developed.

The ceramic reinforcing fibers can be made from single crystal or polycrystalline materials selected from silicon carbide; alumina; graphite; YAG oxide which is composed of yttrium oxide, aluminum oxide, and garnet oxide; mullite; and silicon nitride. Typically, the ceramic reinforcing fibers are polycrystalline silicon carbide fibers.

The fugitive and the ceramic reinforcing fibers herein are typically continuous, which means that the aspect ratio thereof is at least 20, preferably at least 50, and especially at least 100.

Although the reinforcing and fugitive fibers may vary in thickness from a small fraction of a micron to 150 microns in diameter, the typical fiber thickness is from about 1 micron to about 50 microns, especially 5–20 microns. The fibers can be of any desired cross-section, however, the preferred cross-section is about circular. Fibers are usually coated by a protective sizing coating which burns away at an elevated temperature exceeding about 300° C.

Individual fibers can be many meters long arranged in tows which contain a varying number of fibers. Tows of 500 fibers and 6000 fibers, and others, are known and fibers in a tow are held together by natural forces without resort to any additional material or device. Fibers are arranged in tows for practical reasons, such as to facilitate handling thereof. An organic sizing can be used to bind fibers in a tow.

Each individual reinforcing fiber can have a coating thereon. Thickness of the coating may also vary over a broad range with good results. Coating thickness can be as thin as 0.05 micron and as thick as several tenths of a micron, such as 0.6, although the preferred coating thickness is 0.1–0.3 micron.

Suitable coatings are made from materials that can provide the advantages of the composites noted herein, including debonding at the interface of the coating and the matrix. Suitable coating materials include boron nitride and carbon, with boron nitride being the preferred coating material.

The ceramic structures of this invention can be made using a process described hereafter. Pursuant to this process, fugitive fibers are obtained in the form of tows composed of a multiple number of sized fibers. A polymeric sizing coating is provided on the fibers to prevent damage to the fibers in transit. The sizing is burned-off by heating the tows at an elevated temperature of several hundred degrees Centigrade for several hours until the sizing is removed.

When it is desired to form a ceramic structure, tows of fugitive fibers are laid up typically in a screen basket by hand. Although it does not appear possible to make porous ceramic structures exceeding 50% porosity based on the particle packing theory using particulate materials, it is possible to exceed 50% porosity with channels.

In arranging the tows of fugitive fibers in a screen basket, the tows are disposed in the basket so that they extend from one end of the basket to the opposite end. If it is desired to reinforce the ceramic structure and/or have channels of different diameters therein, reinforcing and/or fugitive fibers of different diameters can be included in the lay-up and positioning of reinforcing and/or the fugitive fibers can be varied in a controlled fashion. This arrangement of the tows will produce channels in a ceramic structure that extend from one end thereof to the opposite end. If it is desired to have channels in a ceramic structure that are closed at one or both ends, arrangement of the tows in the screen basket is made so that the tows either are off-set from one end of the basket or are disposed in the basket intermediate its ends. Typically, the tows are arranged in the basket from one end to the opposite so that the channels pass through the ceramic structure from one end through to the opposite end.

When it is desired to make a reinforced ceramic structure of this invention, the volume ratio of the fugitive to the reinforced fibers can vary from 6:1 to 1:6, and especially from 4:1 to 1:4.

When the layup of the tows in the screen basket is finished, the screen basket is lowered into a matrix precursor for a sufficient time to deposit a layer of the matrix precursor on and around the fibers in the tows. Deposition of the matrix precursor on the fibers can be achieved by immersing the entire ceramic structure in the matrix precursor or by immersing one end thereof in the matrix precursor and obtaining infiltration by capillary action. Deposition of the matrix precursor in this manner takes 0.1–5, preferably 0.5–2 hours. The screen basket then is removed from the liquid matrix precursor and dried over steam to convert a matrix form to another matrix form. The screen basket can be lowered into the matrix precursor several times, each time followed by drying. Drying over steam typically takes 1 to 20, preferably 2 to 10 hours.

The ceramic structure is next calcined or heat treated to preserve the matrix in an amorphous state. Calcining temperature is in the range of 500–700° C. and calcining duration is typically 0.1–5, more typically 0.5 to 2 hours. Calcination can be conducted in an inert atmosphere or in a room atmosphere. It is believed that better ceramic structures are obtained if calcination is made after about every three immersions in the matrix precursor.

After calcination, the ceramic structure is hot-pressed at an elevated temperature and pressure in a carbon monoxide or another reducing atmosphere, preventing volatile compounds containing carbon, oxygen and silicon, from escaping the reinforcing fibers. The use of a carbon monoxide atmosphere with a very small amount of oxygen is believed to reduce fiber degradation and to retard carbon and oxygen diffusion from the fibers. Hot pressing in the presence of carbon monoxide is typically carried out when SiC reinforcing fibers are used in the ceramic structure. During hot pressing, carbon monoxide is at an over pressure in excess of 1 atmosphere, temperature is in the range of 1200–1300° C., and pressure is in the range of 15–35 MPa. The hot pressing operation takes typically 10–100, more typically 20–50 hours.

Following the hot pressing operation, the fugitive fibers are typically removed by a special heat treating step which volatilizes the fugitive fibers to form channels in the ceramic structure. The special heat treatment procedure is typically carried out in an oxidizing atmosphere at 200–1000° C., especially 400–800° C., for 1–200, especially 20–100 hours until the fugitive fibers are completely removed.

Removal of the fugitive fibers after hot pressing or other consolidation/densification operation is critical for successful fabrication of these ceramic structures. Post-consolidation removal of the fugitive fibers allows the ceramic structure to contain the desired controlled channel structure. If the fugitive fibers were removed prior to the consolidation operation, it is likely that the consolidation operation would adversely affect the continuity, shape, positioning and other desired qualities of the channels in the ceramic structure.

The invention having been generally described, the following example is given as a particular embodiment of the invention to demonstrate the practice and advantages thereof. It is understood that the example is given by way of illustration and is not intended to limit in any manner the specification or the claims that follow.

EXAMPLE

This example illustrates ceramic structure of FIG. 2 which shows presence of channels and silicon carbde (SiC) reinforcing fibers in a solid zirconium titanate ($ZrTiO_4$) ceramic matrix. The channels were formed by carbon (C) fugitive fibers which were burned out following the hot pressing consolidation operation.

The porous ceramic structure was rectangular in cross-section measuring 1.4 mm×3.00 mm×35 mm. The fugitive and reinforcing fiber tows were cut to about 7.5 cm lengths and were laid up by hand in a screen basket with the fugitive fibers alternating with the reinforcing fibers. The following fibers, in the form of tows, were used:

| | |
|---|---|
| 39 tows of SiC reinforcing fibers weighing | 0.6334 grams |
| 15 tows of C fugitive fibers weighing | 0.1684 grams |
| 63 tows of SiC reinforcing fibers weighing | 1.0143 grams |
| 15 tows of C fugitive fibers weighing | 0.1620 grams |
| 35 tows of SiC reinforcing fibers weighing | 0.6250 grams |
| total fiber weight = | 2.6031 grams |

Fiber weights are indicated here for ease of fabfication. Conversion to volume percent in the final form of the example is easily accomplished by utilizing the known densities of each constituent.

Each fiber was 10–15 microns in outside diameter. The fugitive fibers were Thornel P-55 brand fibers and the SiC reinforcing fibers were Synterials brand fibers with a 0.1–0.3 thick boron nitride coating thereon.

After arranging the tows in the screen basket as described, the screen basket was then immersed in a room temperature matrix solution of zirconium n-propoxide and titanium iso-propoxide diluted with 50% absolute alcohol, mixed in a proportion to yield 50 mole percent of zirconium oxide ($ZrO_2$) and 50 mole percent titanium oxide ($TiO_2$). The fiber preform was immersed in the matrix precursor solution and then was removed and dried for 4 hours over a steaming beaker of water in a drying oven at 110° C., which hydrolyzed the alcoxides, leaving a matrix form of a mixture of hydrated zirconium and titanium hydroxides. After three infiltrations or immersions in the matrix precursor solution, the fiber preform was calcined in flowing air for about 1 hour at about 540° C. The immersions and calcinations were repeated until the desired matrix pick-up was attained. A total of 7 immersions and 3 calcinations were carried out to obtain 49.6% reinforcing and fugitive fiber volume ceramic structure.

Following the final calcination, the fiber preform was densified by means of hot pressing in a carbon monoxide atmosphere, at a slight overpressure of 1.1 atmospheres. The carbon monoxide atmosphere helps to limit fiber degradation during exposure to elevated temperature. The carbon monoxide overpressure was obtained in a chamber prior to the application of either temperature or pressure and was continued until the ceramic structure cooled below 800° C. During the hot pressing operation, minimum pressure of 2.3 MPa was maintained to insure load train alignment. Maxinum consolidation pressure was 17.25 MPa and was applied for 30 minutes after the temperature reached 1270° C.

Following hot pressing, the ceramic structure containing the fugitive and the reinforcing fibers was subjected to a special heat treatment in an oxidizing atmosphere at 700° C. for 48 hours to remove the carbon fugitive fiberts. The ceramic structure thus produced contained 31.9% by volume reinforcing fibers, 12.5% by volume continuous porosity channels, and 50.4% by volume matrix. The reinforcing fibers and the channels were each 10–15 microns in diameter.

While the invention has been described in detail with reference to preffered embodiments thereof, it is understood that veriations and modifications thereof may be made without departing from the true spirit and scope of the invention.

What is claimed is:

1. Process for preparing a porous ceramic structure comprising the steps of:
    (a) arranging tows of elongated fibers generally parallel to each other to form a fiber preform,
    (b) contacting at least once the fiber preform with a matrix precursor whereby the matrix precursor deposits around the fibers,
    (c) removing the fiber preform from the matrix precursor,
    (d) drying the fiber preform,
    (e) calcining the fiber preform to convert the matrix precursor around the fibers to a matrix form,
    (f) hot pressing the structure, and
    (g) removing at least some of the fibers to form channels in the structure.

2. The process of claim 1 wherein said step of contacting is carried out more than once and is carried out by immersing the fiber preform in the matrix precursor.

3. The process of claim 2 wherein said step of removing is carried out in a special heat treatment procedure which includes an oxidizing atmosphere, temperature of 200–1000° C., and duration of 1–200 hours.

4. The process of claim 3 wherein said step of drying is carried out more than once and is carried out in the presence of steam, said step of calcining is carried out more than once and is carried at 500–700° C., and said step of hot pressing is carried out in a reducing atmospher under a pressure of 15–35 MPa at 1200–1300° C.

5. The process of claim 4 wherein said step of hot pressing is carried out over a period of 20–50 hours.

6. The process of claim 4 wherein said step of removing is carried out in a special heat treatment procedure which includes an oxidizing atmosphere, temperature of 400–800° C., and duration of 20–100 hours; wherein the tows of elongated fibers includes fugitive and reinforcing tows in volume ratio of from 4:1 to 1:4.

7. The process of claim 6 wherein porosity of said ceramic structure is 30–70% due to the presence of the channels.

* * * * *